United States Patent [19]

Matthews

[11] Patent Number: 4,941,805
[45] Date of Patent: Jul. 17, 1990

[54] DEVICE FOR CENTERING A DRIVE SHART ON A HUB

[76] Inventor: David Matthews, 1510 Greenbrier, Green Oaks, Ill. 60048

[21] Appl. No.: 384,880

[22] Filed: Jul. 24, 1989

Related U.S. Application Data

[63] Continuation of Ser. No. 150,019, Jan. 29, 1989, abandoned.

[51] Int. Cl.⁵ .............................................. F01D 5/32
[52] U.S. Cl. ........................... 416/204 R; 416/244 R; 416/DIG. 3
[58] Field of Search ........... 416/244 R, 244 A, 244 B, 416/223 R, 223 A, DIG. 3, 204 R

[56] References Cited

U.S. PATENT DOCUMENTS

| | | | |
|---|---|---|---|
| 189,953 | 4/1977 | Niebell | 82/45 |
| 1,366,030 | 1/1921 | Silver | 425/34.3 |
| 1,428,620 | 9/1922 | Wilber | 29/6 |
| 1,566,272 | 12/1925 | Costa | 416/60 |
| 1,613,903 | 1/1927 | Randall et al. | 82/45 |
| 1,781,960 | 11/1930 | Schultz | 416/244 |
| 2,731,193 | 1/1956 | Lall et al. | 416/DIG. 3 |
| 2,828,536 | 4/1958 | Kaiser | 29/406 |
| 2,955,748 | 10/1960 | Killian | 416/DIG. 3 |
| 3,409,489 | 11/1968 | Renton | 416/DIG. 3 |
| 3,904,211 | 9/1975 | Dega | 415/170 A |
| 4,053,260 | 10/1977 | Yee | 416/244 R |
| 4,610,601 | 9/1986 | Gerfast | 416/DIG. 3 |
| 4,611,972 | 9/1986 | Andrae | 416/214 R |
| 4,652,169 | 3/1987 | Matthews | 416/244 R |

FOREIGN PATENT DOCUMENTS

| | | | |
|---|---|---|---|
| 542232 | 6/1957 | Canada | 416/DIG. 3 |
| 0070265 | 1/1983 | European Pat. Off. | |
| 2247362 | 4/1974 | Fed. Rep. of Germany | 416/DIG. 3 |
| 409 | 1/1978 | Japan | 416/144 |
| 72694 | 4/1983 | Japan | 416/244 A |
| 159934 | 9/1983 | Japan | 416/DIG. 3 |
| 29554 | 4/1933 | Netherlands . | |
| 127355 | 6/1916 | United Kingdom | 416/DIG. 3 |
| 830385 | 3/1960 | United Kingdom | 416/DIG. 3 |
| 2192432 | 1/1988 | United Kingdom | 416/DIG. 3 |

OTHER PUBLICATIONS

Photograph illustrating the tongue of a child's wagon.

*Primary Examiner*—Robert E. Garrett
*Assistant Examiner*—John T. Kwon
*Attorney, Agent, or Firm*—Hill, Van Santen, Steadman & Simpson

[57] ABSTRACT

A method and device for mounting and centering a thin wall hub of a driven member onto a drive shaft provides the shaft with a radial end face which projects an axially extending reduced diameter threaded stud which fits within a central aperture of the hub and secures a nut to clamp the hub between the end face and nut. A raised shaft embracing portion centered on the hub axis snugly embraces the outer periphery of the drive shaft and axially aligns the two members. The drive shaft may also incorporate a drive pin which extends axially from the end face and is seated in a second aperture in the hub to provide effective driving of the hub by the drive shaft.

11 Claims, 1 Drawing Sheet

DEVICE FOR CENTERING A DRIVE SHART ON A HUB

This is a continuation of application Ser. No. 150,019 filed Jan. 29, 1989, now abandoned.

BACKGROUND OF THE INVENTION

1. Field of the Invention

This invention relates to the art of concentrically mounting thin wall hubs of driven members on drive shafts and specifically deals with the provision of shaft embracing embossments on a thin wall shaft receiving hub concentric with the hub axis to center the hub on the shaft regardless of clearances between the shaft and the shaft receiving aperture of the hub.

2. Prior Art

Heretofore mounting of thin wall fan blade hubs on drive shafts frequently presented a balancing problem brought about by eccentric misalignment of the blade hub axis and the drive shaft axis. In such installations the shaft has an end face or annular shoulder receiving the hub and a reduced diameter threaded stud portion projecting through a central aperture in the hub. A nut is then threaded on the stud portion to drivingly clamp the hub to the shaft. Such installations require clearance between the shaft and hub aperture permitting misalignment of the axis of the shaft and the axial center of the hub. In an attempt to minimize such misalignment the hubs were made sufficiently thick to accommodate a well receiving the shaft. Such installations were heavy and costly.

It would therefore be an improvement in this art to prevent misalignment of hubs on shafts without requiring massive thick hubs and it would especially be an improvement in this art to provide fan blade units with thin wall central hubs having raised shaft embracing rim portions lying in a circle centered on the axis of the fan blade unit around the shaft receiving aperture.

It would be a still further improvement in this art to emboss raised shaft embracing portions on thin wall hubs of fan blade units or the like to center the unit on the end of a drive shaft without increasing the thickness of the hub.

SUMMARY OF THE INVENTION

The hub portions of thin wall units such as fan blades are provided with means for centering the hub on a shaft without increasing the wall thickness of the unit. This is accomplished by providing a thin wall hub portion of the unit with a central shaft receiving aperture surrounded by shaft embracing embossments lying in a circle centered on the true axis of the unit. These embossments snugly embrace the shaft periphery when the hub is bottomed on a radial shaft shoulder from which projects a reduced diameter threaded stud extending through the hub aperture. Then when a clamping nut is threaded on the stud the axis of the shaft and the true center axis of the unit are exactly aligned. This avoids balancing problems usually encountered in mounting thin wall fan units on drive shafts.

In fan blade units made from stamped metal, the shaft embracing rim can be in the form of embossed beads, dimples, tangs, and the like and can be formed either at the time the fan blade units are stamped or, preferably, subsequently thereto. In plastic material fan blade units the shaft embracing portions can be molded on the hubs.

A preferred arrangement includes the provision of a second aperture in the hub spaced radially outward from the central shaft receiving aperture for receiving a drive pin or other drive projection on the end of the shaft to couple the shaft with the unit.

BRIEF DESCRIPTION OF THE DRAWINGS

Further features and advantages of the present invention are set forth with particularity in the appended claims. The invention may best be understood by making reference to the following description, taken in conjunction with the accompanying drawings and several figures of which like reference numerals identify identical elements and wherein:

DESCRIPTION OF THE PREFERRED EMBODIMENTS

Figure 1:
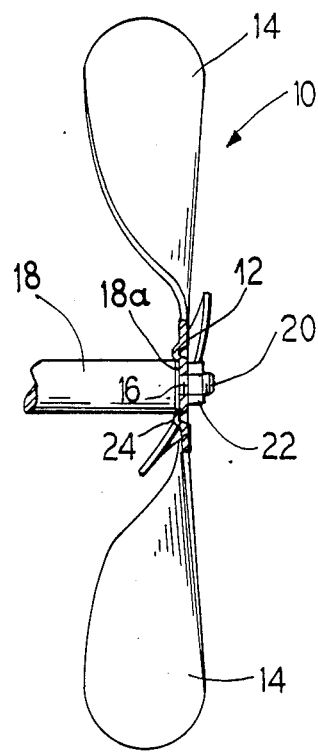
FIG. 1 is a side elevational view in partial cross-section of a fan blade unit with a thin wall shaft receiving hub incorporating the present invention.

The principles of the present invention are particularly useful in forming a hub construction for a fan blade assembly generally indicated at 10 having a hub 12 with a plurality of circumferentially spaced fan blades 14 radiating around its periphery. The hub 12 has a central aperture 16 and is mounted on a drive shaft 18 by an axially projecting reduced diameter threaded stud portion 20 of the shaft which projects from the distal end face or radial shoulder 18a of the drive shaft 18 and extends freely through the central aperture 16 in the hub 12 so that the hub 12 seats on the distal end 18a. The fan blade assembly 10 is then secured to the drive shaft 18 by a nut 22 which is threaded onto the stud portion 20 to clamp the hub 12 between the distal end 18a and nut 22.

The central aperture 16 of the hub 12 has a diameter slightly larger than the outside diameter of the stud portion 20 of the drive shaft 18 to enable the stud portion 20 to be inserted through the aperture 16 without damaging its threads. Consequently, exact centering of the hub 12 on the drive shaft 18 cannot be achieved by the interaction of the stud portion 20 and the central aperture 16 alone.

Figure 2:
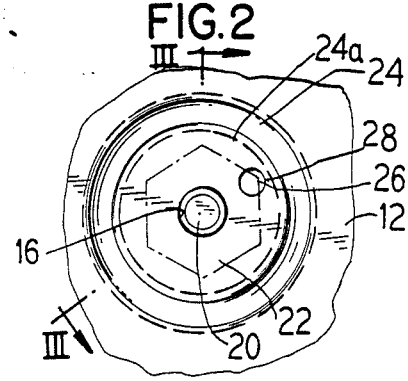
FIG. 2 is a fragmentary front elevational view along the line II—II of FIG. 1.
Figure 3:
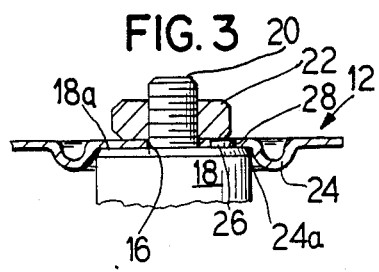
FIG. 3 is a cross-sectional view of the hub of FIG. 2 taken along line III—III of FIG. 2.

In order to provide centering of the hub 12 on the drive shaft 18, a depending shaft embracing cylindrical bead or rim portion 24 is formed on the shaft engaging face of the hub 12 forming a circular recess 24a as illustrated in the exemplary embodiment of FIGS. 2 and 3. This rim portion 24 is formed in a circle which is centered with respect to the central axis of the fan blade assembly 10 and extends around the shaft receiving central aperture 16 formed in the hub 12. The inside diameter of the rim portion 24 is chosen to correspond to the outside diameter of the drive shaft 18 so that its distal end 18a may fit snugly within the recess 24a formed by the rim portion 24. As can be discerned from examining FIGS. 2 and 3, when the threaded stud 20 of the drive shaft 18 is inserted within the aperture 16 of the hub 12, the inside periphery of the rim portion 24 is snugly seated around the outer periphery of the drive shaft 18 which acts as a centering guide and enables the drive shaft 18 to be centrally located with respect to the hub 12 as shown in FIG. 1, the rim portion 24 is distinct from the fan blades 14, being on a relatively flat portion of the hub 12.

In order to provide driving of the hub 12 by the drive shaft 18 without completely relying on the clamp fit of the hub 12 between the distal end 18a of the drive shaft 18 and the nut 22, a drive pin or drive projection 26 may be provided on the distal end of the drive shaft 18. This drive pin 26 is spaced radially outward from the central axis of the drive shaft 18 and is received within a second aperture 28 provided in the hub 12. It is to be noted that the drive pin 26 may have a variety of shapes and sizes and, alternatively, the drive pin 26 may project from the hub 12 while the aperture 28 may be located within the distal end 18a of the drive shaft 18 without departing from the teachings of the present invention.

Figure 4:
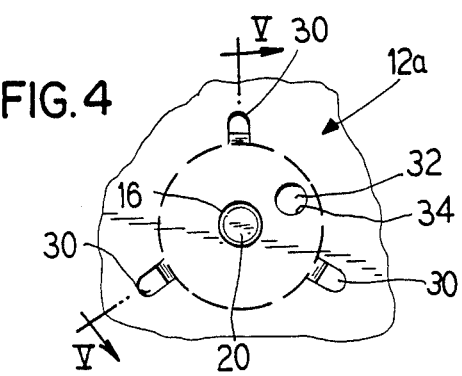
FIG. 4 is a fragmentary front elevational view of a second embodiment of the hub of the present invention.
Figure 5:
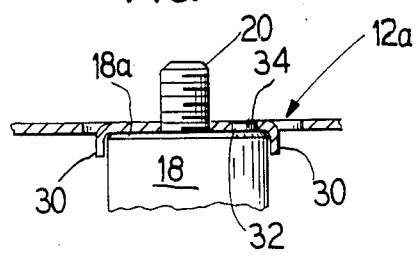
FIG. 5 is a cross-sectional view of the hub of FIG. 4 taken along line V—V of FIG. 4.

FIGS. 4 and 5 illustrate another exemplary embodiment of the present invention. In this embodiment, the hub 12a is provided with a plurality of lanced out tangs or tongues 30 lanced from the shaft engaging face of the hub 12a and are spaced radially outward from the central aperture 16. In this exemplary embodiment, three tangs 30 are employed and are arranged in a circle whose diameter corresponds to the diameter of the drive shaft 18 so that its distal end 18a may fit snugly within the tangs 30. Additionally, a drive pin 32 may be included on the distal end 18a of the drive shaft 18 which is received within an aperture 34 within the hub 12a. The drive pin 32 and the aperture 34 are similarly spaced radially outward from the aperture 16 and lie within the circle circumscribed by the tangs 30.

Figure 6:
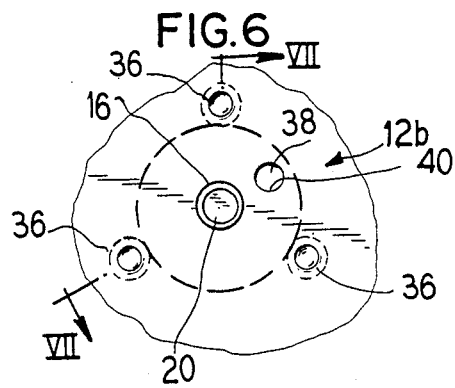
FIG. 6 is a fragmentary front elevational view of a third embodiment of the hub of the present invention.
Figure 7:
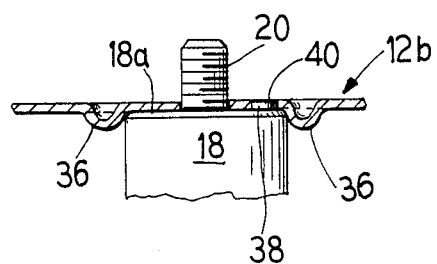
FIG. 7 is a cross-sectional view of the hub of FIG. 6 taken along line VII—VII of FIG. 6.

A further modified hub 12b may be provided with a plurality of raised dimples or beads 36 which, like the tangs 30, are similarly spaced radially outward from the aperture 16 of the hub 12b as shown in FIGS. 6 and 7. In this exemplary embodiment, three dimples or beads 36 are arranged in a circle, similar to the tangs 30 of FIGS. 4 and 5, whose diameter corresponds to the diameter of the drive shaft 18 so that its distal end 18a may fit snugly between the dimples or beads 36. A drive pin 38 may also be employed in this embodiment which is received within an aperture 40 in the hub 12b.

The embracing rim 24, tangs 30 or dimples or beads 36 snugly embrace the outer periphery of the drive shaft 18 when the hub 12, 12a or 12b is bottomed on the distal end 18a of the shaft 18 and exactly axially align the hub on the shaft 18 to avoid any balancing problems during operation of the fan blade assembly 10.

It is to be noted that the present invention may be incorporated in fan blade assemblies 10 constructed of metal having the particular rim 24, tangs 30 or dimples or beads 36 stamped or formed thereon or may alternatively be molded of plastic.

As may be understood by those of skill in the art from the foregoing, the illustrated rims 24, tangs 30 and dimples 36 are readily adapted to being formed on the flat hub 12 after an exact center of the fan unit has been found. This necessarily occurs after the fan unit is formed.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim:

1. A method of centering and drivingly connecting the hub of a driven member with a drive shaft having an end face with a centrally projecting externally threaded stud which comprises:
   forming an apertured radial wall on the hub for receiving the stud therethrough and for bottoming on the end face of the shaft,
   forming shaft embracing portions on the face of the hub to be bottomed on the end face of the shaft to center the true axis of the hub on the shaft, said shaft embracing portions being formed after the driven member is formed and assembled, and
   threading a nut on the stud to clamp the wall between the end face of the shaft and the nut.

2. The method of claim 1, including the added steps of forming a drive pin projection on said end face of the shaft and providing a pin receiving recess in said wall of the hub.

3. The method of claim 1, including the step of forming said portions by deforming an annular bead in said wall of the hub for embracing said shaft.

4. The method of claim 1, including the step of forming said portions by depressing a plurality of circumferentially spaced tangs from said wall for embracing said shaft.

5. The method of claim 1 including the step of forming said portions by embossing a ring of circumferentially spaced beads on the wall for embracing the shaft.

6. A hub construction for connecting and centering a driven member on the end of a drive shaft having an end face with a reduced diameter externally threaded stud which comprises:
   a hub having an apertured wall for receiving said stud therethrough and for bottoming on said end face of the shaft, said wall having a shaft embracing portion centered on the hub axis to axially align the hub on the shaft axis, said embracing portion being of a shape capable of being formed after said driven member is formed, and
   a nut threaded on the stud clamping said wall to the end face of the shaft.

7. The hub construction of claim 6, wherein said shaft embracing portion is an annular bead depressed from said wall providing a rim surrounding the shaft.

8. The hub of claim 6, wherein said portion is a plurality of circumferentially spaced projections on the wall embracing the shaft.

9. The hub of claim 6, wherein said portion is a plurality of circumferentially spaced tongues projecting from the wall for embracing said shaft.

10. A fan blade construction for mounting on the end of a drive shaft having a radial end face with a centrally extending reduced diameter threaded stud which comprises:
    a thin wall flat hub having radially extending fan blades around its periphery and a central aperture receiving the stud of the drive shaft, said hub having a shaft embracing section capable of being formed after said fan blades are provided on said hub, said embracing section surrounding the aperture to center the hub on the end face of the drive shaft and a recess for receiving a drive pin projection from the end face of the drive shaft.

11. A fan blade construction as claimed in claim 10, wherein said thin wall flat hub is integrally formed with said fan blades.

* * * * *

UNITED STATES PATENT AND TRADEMARK OFFICE
CERTIFICATE OF CORRECTION

PATENT NO. : 4,941,805
DATED : July 17, 1990
INVENTOR(S) : David Matthews

It is certified that error appears in the above—identified patent and that said Letters Patent is hereby corrected as shown below:

On the title page, in item [54] and in column 1, line 2, in the title, "SHART" should be --SHAFT--.

Signed and Sealed this

Twenty-fifth Day of June, 1991

Attest:

*Attesting Officer*

HARRY F. MANBECK, JR.

*Commissioner of Patents and Trademarks*